US010355993B2

(12) United States Patent
Ricco et al.

(10) Patent No.: US 10,355,993 B2
(45) Date of Patent: Jul. 16, 2019

(54) SAFE NETWORK INTERFACE

(71) Applicant: Mercury Mission Systems International S.A., Lancy (CH)

(72) Inventors: Philippe Ricco, Annemasse (FR); Yves Mathys, Bernex (CH); Khaled Bettaïeb, Hauterive (CH)

(73) Assignee: Mercury Mission Systems International S.A. (CH)

( * ) Notice: Subject to any disclaimer, the term of this patent is extended or adjusted under 35 U.S.C. 154(b) by 0 days.

(21) Appl. No.: 15/724,321

(22) Filed: Oct. 4, 2017

(65) Prior Publication Data

US 2018/0145909 A1     May 24, 2018

(30) Foreign Application Priority Data

Nov. 18, 2016    (EP) ..................................... 16199505

(51) Int. Cl.
*H04L 12/741* (2013.01)
*H04L 12/851* (2013.01)
*H04L 29/12* (2006.01)
*H04B 7/185* (2006.01)
*H04L 29/06* (2006.01)
*H04L 12/40* (2006.01)

(52) U.S. Cl.
CPC ....... *H04L 45/745* (2013.01); *H04B 7/18506* (2013.01); *H04L 12/40032* (2013.01); *H04L 47/24* (2013.01); *H04L 61/103* (2013.01); *H04L 69/22* (2013.01)

(58) Field of Classification Search
CPC ... H04L 12/0032; H04L 45/745; H04L 69/22; H04L 47/24; H04L 61/103
See application file for complete search history.

(56) References Cited

U.S. PATENT DOCUMENTS

| 6,760,782 | B1 | 7/2004 | Swales |
| 6,925,088 | B1 | 8/2005 | Moreaux |
| 7,065,095 | B2 | 6/2006 | Coden |
| 7,346,052 | B2 | 3/2008 | Saint Etienne et al. |
| 2008/0212504 | A1 | 9/2008 | Venkataraman et al. |
| 2010/0195634 | A1 | 8/2010 | Thompson |
| 2016/0182084 | A1* | 6/2016 | Yang ................. H03M 13/1515 341/87 |
| 2018/0062987 | A1* | 3/2018 | Badillo ................... H04L 45/66 |

FOREIGN PATENT DOCUMENTS

EP      1309131 A1    5/2003

OTHER PUBLICATIONS

European Search Report for EP Application No. 16199505.5, dated Feb. 17, 2017, 6 pages.

* cited by examiner

*Primary Examiner* — Mewale A Ambaye
(74) *Attorney, Agent, or Firm* — Blank Rome LLP

(57) ABSTRACT

Deterministic network interface for an avionic network, configured for two Ethernet physical media, with two neighboring network interfaces. The network interface of the invention allows the realization of ring-topology network without collision in the physical Ethernet media. The communication between nodes is carried out in a fully deterministic fashion by an unconnected (UDP) protocol. The interface of the invention incorporates a hardware end-to-end integrity mechanism that ensures message integrity from the memory of the sender host to that of the recipient one.

9 Claims, 2 Drawing Sheets

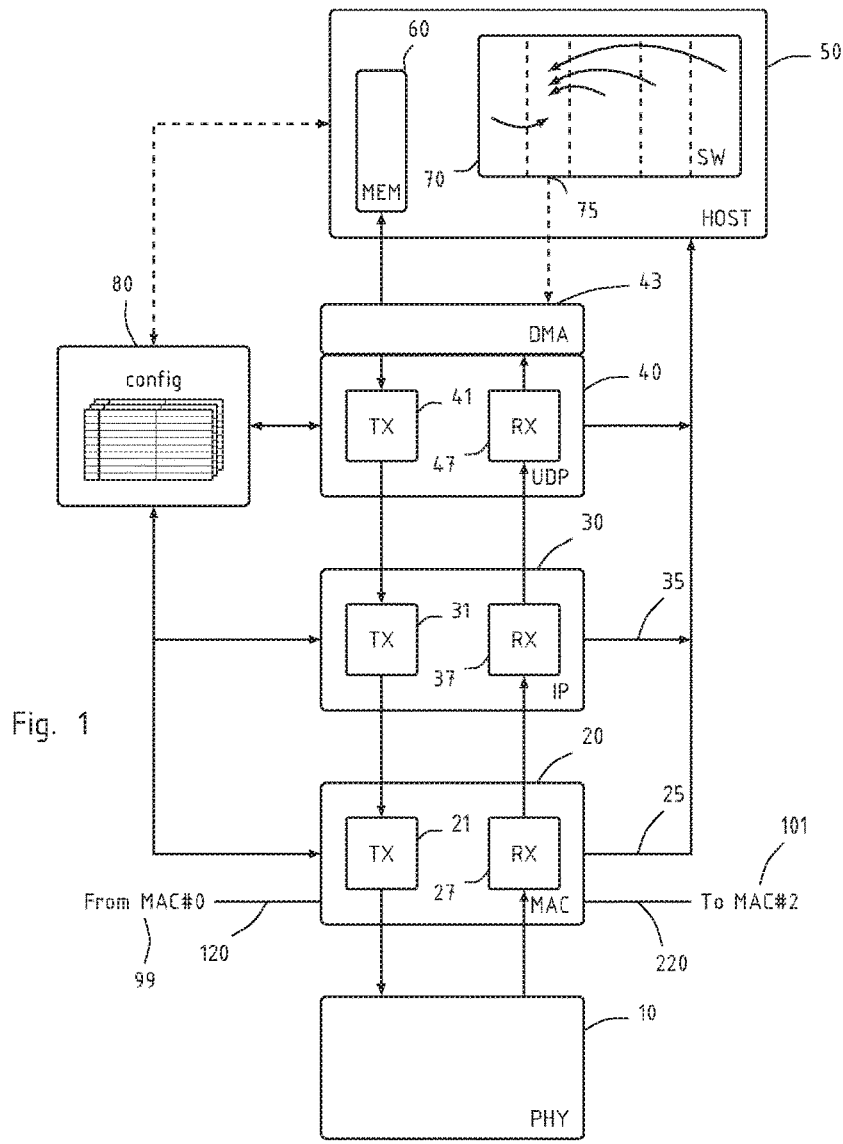
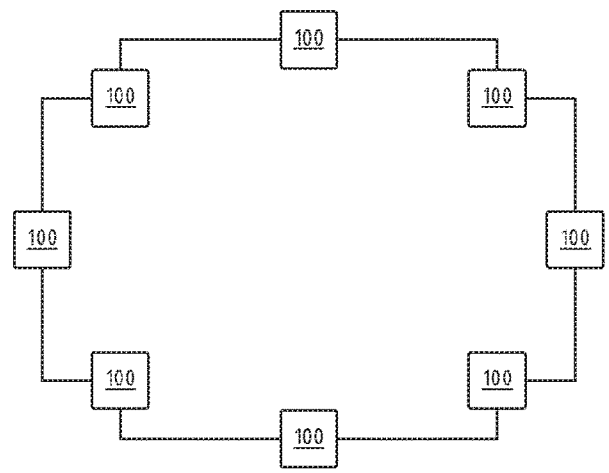
Fig. 1
Fig. 2

# SAFE NETWORK INTERFACE

REFERENCE DATA

The present application claims priority from European patent application EP16199505.5 of Nov. 18, 2016, the contents whereof are hereby incorporated by reference.

FIELD OF THE INVENTION

The present invention concerns a network interface, and in particular an interface for critical communication between digital systems. In particular, but not exclusively, the present invention relates to a network interface providing safety critical communication between networked sub-systems. The invention is particularly suitable for avionics applications, but its domain encompasses all situations requiring highly reliable, wide-bandwidth networking.

DESCRIPTION OF RELATED ART

With the rise of the "digital airplanes" there has been a drive to improve the integration of the actuators, sensors and computing subsystem in an aircraft by means of digital networks. While the introduction of data networking in aircrafts has brought a host of advantageous possibilities, there is a concern that conventional network interfaces and protocols do not meet the stringent safety requirements of avionics applications.

The Ethernet network is the reference in the field of wired communication networks. The switched full-duplex implementation described, for example, in open standard IEEE 802.3, is frequently used in industry and the necessary hardware and software components are widely and easily available. Nevertheless, this commercial cannot provide the reliability and determinism that are required in avionics applications.

Specific data buses and protocols for aircrafts have been developed. These bespoke solutions, however, do not always provide the high bandwidth required in modern fly-by-wire aircraft, and, when they do, the gain in performance is accompanied by substantial cost increases.

Some providers, for example Airbus with his AFDX® technology, propose Ethernet-based network that can provide the required reliability, by sharing the available bandwidth between "virtual links" in a deterministic fashion. This technology is described, among others, in publications EP1309131 and U.S. Pat. No. 6,925,088.

US2010195634 and U.S. Pat. No. 6,760,782 also disclose Ethernet networks especially devised for avionics or high-reliability applications.

The present invention aims to provide a deterministic communication interface between subsystems in an aircraft that has mechanisms to guarantee communication determinism for what latency, jitter and bandwidth are concerned, as well as data integrity, and uses Ethernet compatible protocols and hardware.

BRIEF SUMMARY OF THE INVENTION

According to the invention, these aims are achieved by means of the object of the appended claims. In particular, the invention proposes to this effect, a deterministic network interface, configured for connection with one host system and two Ethernet physical media, such that the interface is connectable with two neighbouring network interfaces, the interface comprising a Media Access Control layer, operatively arranged for receiving and transmitting data from and to said two neighbouring network interfaces, and for receiving and transmitting data from and to the host system, wherein the deterministic network interface comprises a programmable configuration area and is operatively arranged for inserting and/or recognizing IP and/or MAC addresses in the Ethernet packets based on an address table stored in the configuration area, and wherein the transit of data through the network interface is time-deterministic.

The invention further proposes a deterministic network interface as above, operatively arranged for transferring messages received from one neighbouring node to the host system or relaying them to the other neighbouring node based on a deterministic decision; the invention also proposes, optionally, that the network interfaces configured and structured as above, be arranged for transferring messages received from one neighbouring node to the host system or relaying them to the other neighbouring node based on a deterministic decision; that the Media Access Control layer and/or an IP layer may be operatively arranged for detecting errors in the data received, raising an error flag for the host system, and/or storing the erroneous data in a memory means for further treatment; that the interface may include a UDP layer; and that the interface be operatively arranged for not transmitting a message if it is determined that it has been relayed between neighbouring nodes more than a determined number of hops The invention further relates to a deterministic network, or network protocol, in an aircraft, comprising a plurality of nodes arranged in a ring topology, each node comprising a network interface as above specified, each network interface of each node being connected with the network interfaces of the two adjacent nodes in the ring; which may have a communication mode in which nodes communicate between them by UDP packets exclusively, the IP and/or MAC addresses of the nodes being statically determined, the configuration areas of the network interfaces storing a table of the IP and MAC addresses of other nodes in the network.

BRIEF DESCRIPTION OF THE DRAWINGS

The invention will be better understood with the aid of the description of an embodiment given by way of example and illustrated by the figures, in which:

FIG. 1 shows a schematics representation of an embodiment of the present invention FIG. 2 shows a plurality of network interfaces according to the present invention arranged in a ring topology.

DETAILED DESCRIPTION OF POSSIBLE EMBODIMENTS OF THE INVENTION

Figure 3:
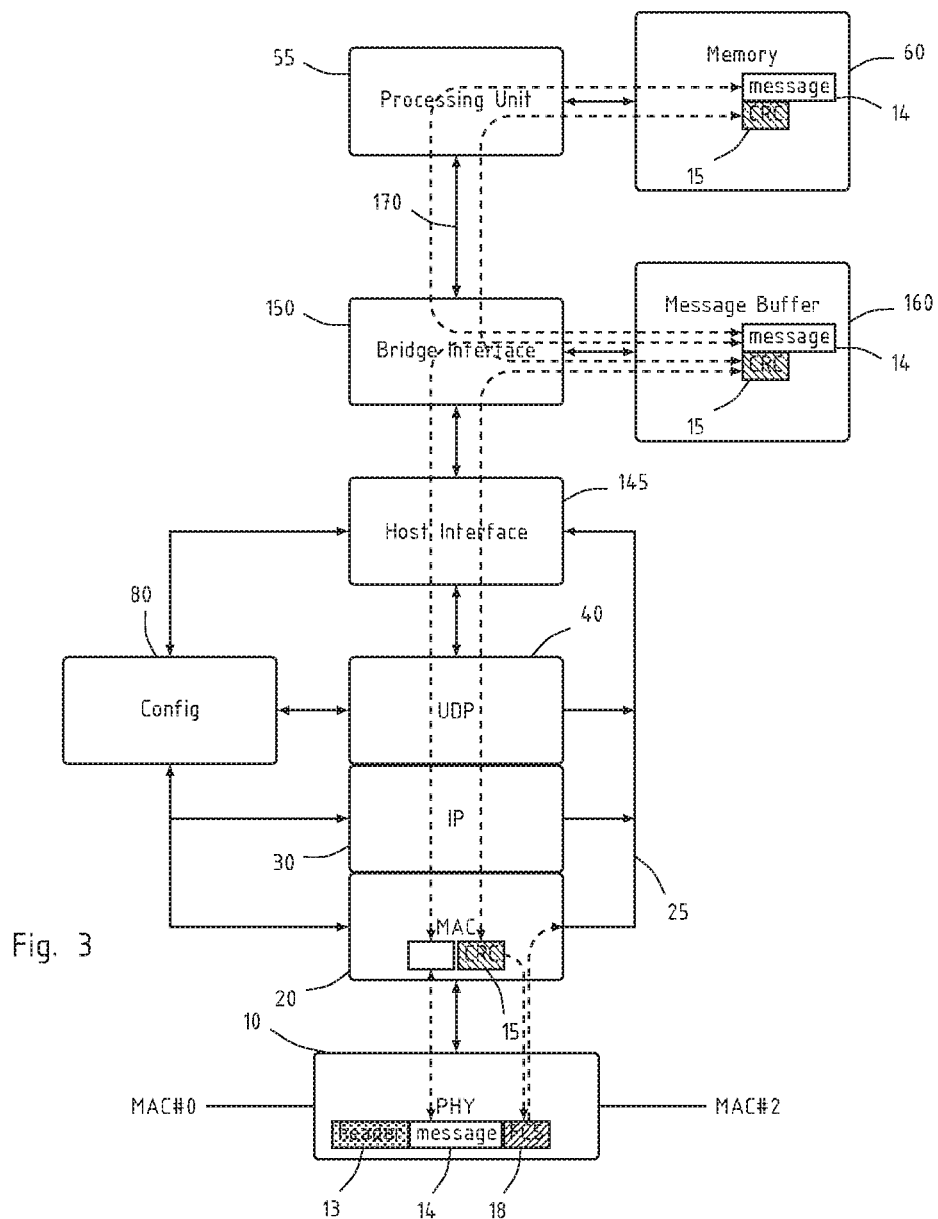
FIG. 3 illustrates an end-to-end integrity mechanism according to an aspect of the present invention.

FIG. 1 represents a network interface according to one aspect of the present invention. The host system 50 includes a processor unit programmed for executing one or more software programs, symbolically represented in the block 70, on a memory 60 that may be for example, a block of dynamic RAM memory.

In the frame of the invention, the host system 50 could be any other networked device. In an aircraft, the host system might include a flight management system, a flight display unit or subunit, an air data computer, a navigation unit, a gyroscope, a surface actuator, a radio, a radar unit, but this list is far from exhaustive.

The host system 50 is connected to other subsystem or network nodes in the aircraft by means of a safety-critical network interface that is represented by the layers 40, 30, 20, 10 of FIG. 1. Data flow across the layers in a deterministic way from the host processor 50 to the PHY transceivers 10, and to adjacent network interfaces by the physical media 120, 220, that might be gigabit-Ethernet copper cables or fibres, and the other way around.

Layer 40 is a UDP transport layer that dispatches data between the host 50 and other hosts on the network. As it is stipulated by the UDP protocol, layer 40 provides redundancy for data integrity and manages data in messages, usually referred as datagrams. Layer 40 has no provisions for handshaking or error checking, and makes no attempt to ensure delivery of the messages, or to preserve their order. These functions are achieved by the software with the support of the lower communication layers, as it will be explained in the following.

The memory interface consists in a dual FIFO buffer 41, 47 for the transmit data, respectively the receive data. Data are transferred to and from the processor memory 60 by a DMA interface 43, under instruction from the software, but without processing by the host CPU. Optionally, the DMA interface is synchronized with a time and space partition in a real-time operating system (RTOS) to ensure that the transactions are atomic within the partition. Only one partition 75 of the operating system is linked to the DMA.

The UDP layer implements in particular the encapsulation of the messages received from the host system, into valid UDP datagrams, and the extraction of the message from the datagrams received from the hierarchically lower layers. Importantly, these operations are autonomously executed in the network interface and are time-deterministic, in the sense that the passage through the UDP layer, in either direction, does not introduce any unforeseeable delay. The UDP layer may use information stored in the parameter area 80, for example in coding and decoding the UDP ports, in a manner that will be explained in detail later on.

The RX section 47 of the UDP unit 40 may detect errors in the datagram, for example by checking the UDP checksum, if it is present, and, in this case, raise a signal to the host system.

The network interface of the invention may manage the encapsulation of UDP datagrams into IP packets. The layer 30 is an IP layer, hierarchically below the UDP layer 40. It may provide, for example, address translation, routing, splitting and reassembling of messages, and the function conventionally associated to network layers. It has, like the UDP layer 40, a pair of FIFO buffers 31, 37 for the transmitted, respectively received data. In particular, the IP layer implements the encapsulation of UDP datagram in valid IP frames, the extraction of UDP datagram from the IP packet in the opposite direction. As for the UDP layer, at least the transit of UDP datagrams through the IP layer 30 is autonomous and deterministic. The IP layer may make use of information stored in the parameter area 80, for example, IP addresses.

The receive buffer 37 can detect errors in the received packets and report them to the host processor 50. A flag may be sent to the host processor in case of error, and the erroneous packets are copied in a bin buffer, accessible by the host processor 50 for further analysis.

Block 20 represents a Media Access Control (MAC) layer that is responsible for managing the access to the physical media 120, 220, using the physical layer 10 as interface. It has also the capability of detecting and possibly correct errors in received data, and reports them to the host processor 50. Error signalling may use the same flag and bin-buffer mechanism as in block 30.

The MAC layer 20 is responsible for the encoding of valid MAC frames, encapsulating the UDP/IP packets from the layers above, which in turn contain the original message, and for the decoding in the opposite direction. These processing steps are carried out autonomously and in a time-deterministic fashion, as above. To this end, the MAC layer uses information stored in the configuration area 80, for example the MAC addresses.

Importantly, the network interfaces 100 of the invention are connected to two adjacent nodes having similar characteristics, indicated by MAC#0 and MAC#2 in FIG. 1. The TX side of the MAC layer 20 receives data either form the IP layer 30 above, or from an adjacent node MAC#0 via the medium 120, and forwards it to the physical layer 10. Conversely, the RX side of the MAC layer 20 receives data from the physical layer 10 and forwards them either to the above IP layer 30 or to the following node MAC#2. FIG. 2 shows a ring-topology network composed of individual nodes 100 each of which may present the structure illustrated in FIG. 1, in an aircraft. Other topologies, however, are possible.

In the MAC layer, a decision is taken whether to route the data to the next node (MAC#2, 101) or to the above layers, based for example on address matching or any other suitable criterion. A logic is added to ensure that packets have a finite lifetime and do not flood the network by circulating indefinitely. In a possible implementation a HOP counter is decremented at each passage starting from an initial value, and the packet is not retransmitted when the counter reaches zero.

The TX buffer 21 accepts data from the IP layer 30 or from the paired MAC#0 (99). A deterministic arbitration algorithm regulates the traffic between these two sources. Importantly this arbitration, in combination with the ring topology, totally prevents collisions of packets, ensuring a deterministic network behaviour.

Importantly, the network interfaces of the invention are each connectable with two neighbouring network interfaces in such a way to form a network entirely composed by point-to-point connections. Full-duplex Ethernet is used between each pair of neighbouring nodes; and the network is entirely collision-free.

Since the communication on the network realized by the network interfaces is totally based on unconnected packets, for example UDP packets, no signalling or acknowledgements are implied, thereby avoiding a possible cause of resource contention that could introduce unforeseeable delays in packet propagation.

Moreover, the network interfaces includes an address resolution unit that avoid any non-deterministic delay in packet delivery, as it will be described in the following.

Each network interface includes a programmable configuration area 80 that stores, among other, an address table that records the level 2 (MAC) and level 3 (IP) addresses of all the network's nodes with whom the interface needs to communicate. Importantly, the allocation of MAC and IP addresses in the network is static, and the system does not rely on the conventional address resolution and configuration protocols like ARP, DNS, DHCP and the like.

The address table in the programmable configuration area 80 can be pre-programmed, set by the CPU of the host system, filled dynamically, or provided in any other way.

Importantly, the host system needs not to know the IP or MAC address of a device with whom he communicates to identify it. Devices on the network can be identified by an index locating them in an address configuration table stored in the configuration area 80 of the network interface. The configuration area 80 may contain also supplemental addressing information, for example, the UDP port numbers of given remote or local services in the network. The host system may be capable of reading from and/or writing into the address configuration table 80, however.

When sending a message to another node in the network, the network interface receives from the host system the message that must be sent, and a high-level identifier of the designated recipient. The network interface selects IP and MAC addresses from the address configuration table 80 based on the received identifier. The latter can be an index, a pointer, or any information that allows selecting an entry in the address configuration table. The network interface is operatively arranged for building an Ethernet packet encapsulating the intended message, without the assistance of the host system. The address resolution may be implemented by a suitably programmed FPGA, in an ASICS, by a programmed CPU, or by any other suitable logic unit. Appropriate UDP port numbers may also be included in the Ethernet frame in the same way.

Conversely, when receiving a Ethernet packet from another node, the network interface of the invention finds the entry in the configuration table 80 that corresponds to the MAC and IP addresses in the message, and provides to the host system the payload of the frame, that is the message that was originally sent; and an information that identifies the sender in the configuration table 80, for example an index. As for the transmission's case, the network interface of the invention is capable of carrying out these operations autonomously in a time-deterministic manner, without assistance from the host system.

In the description of this invention, the layers of the interface stack have been represented and discussed as separate entities, for simplicity sake. This, however, is not an essential feature of the invention that could also include variant in which some of the above layers are combined together, share some hardware element, or are realized fully or in part in software.

FIG. 3 illustrates another important aspect of the invention: an end-to-end integrity. In this embodiment, the network interface of the invention communicates with the host system, represented by a CPU 55 and a memory 60, through a host interface 145, a bridge interface 150, and a high speed link 170. A buffer 160 is interposed between the network interface and the high speed link. In this kind of structures, that are widespread in modern avionics systems, the data must travel across several bus and temporary storage, where it could be corrupted by noise, interferences, or high-altitude radiation. There is therefore a need of an integrity control mechanism.

Ethernet protocols, and other protocols in the same family, protect the data on the physical medium by an error-detecting code, denoted usually as FCS, or Frame Check Sequence. FIG. 3 shows an exemplary Ethernet frame that is composed by an header, which contains destination and target physical addresses, a message or payload 14 and a FCS 18 that is a CRC coded obtained from the header+ message sequence and appended as trailer. When the frame is received by the intended node, the CRC is recalculated and verified against the received FSC to detect alterations or errors in the message.

According to one aspect of the invention, when the message 14 to be transmitted is composed in the memory 60 of the host, an error-detecting code 15 is computed and associated to the message. The error-detecting code can be for example a CRC, or the result of any suitable error-correcting function. The message is then sent towards the network interface through all the various links and buffers, and descends the protocol stack to the MAC layer 20. When the message is received in the network interface, the error detecting code 15 is verified and stripped from the message. In the figure, the verification is drawn at the MAC level, but it could happen also in one of the upper layers.

If the verification of the CRC code 15 fails, the message 14 has been altered in the passage from the host system to the network interface, and the network interface can be programmed to take corrective or remedial actions. An error code 25 can be generated, to allow the sender to correct the situation. The message may be retained, or sent anyhow to the intended recipient, but is combined with an invalid FSC sequence, such that the recipient will detect the error and react as if the error had arisen in the physical Ethernet layer. Advantageously, this manner of dealing with errors does not require the management of new error conditions in software.

In the other direction, when the MAC unit 20 receives a frame from the network, it verifies the FSC, strips it from the message, and computes a CRC 15 that corresponds to the message received. The CRC 15 is transmitted with the message 14 to the host system where, once it is received, is verified again. The host can then have the confirmation that the message is unaltered, or, in the contrary case, take appropriate measures.

REFERENCE NUMBERS

10 PHY layer
13 MAC header
14 message
15 error correction code
18 frame check sequence
20 MAC layer
21 MAC TX buffer
25 error signalling
27 MAC RX Buffer
30 IP layer
30 IP TX buffer
31 error signalling
35 IP RX buffer
37 UDP layer
41 UDP TX buffer
43 DMA interface
47 UDP RX buffer
50 host system
55 processing unit
60 memory
70 software
75 partition
80 configuration tables
99 previous node
100 network node
101 next node
120 physical media
145 host interface
150 bridge interface
160 message buffer
170 high-speed link
220 physical media

The invention claimed is:

1. A deterministic network interface, configured for connection with one host system and two Ethernet physical media, such that the interface is connectable with two neighbouring network interface, the deterministic network interface comprising a Media Access Control layer (MAC), configured to receive and transmit data from and to said two neighbouring network interfaces, and receiving and transmitting data from and to the host system, wherein the deterministic network interface comprises a programmable configuration area and is configured to insert or recognize IP or MAC addresses in the Ethernet packets based on an address table of the IP or MAC addresses of other nodes of the network stored in the configuration area, and wherein the transit of data through the network interface is time-deterministic.

2. The deterministic network interface of claim 1, configured to transfer messages received from one neighbouring node to the host system or relay the messages received from one neighbouring node to the other neighbouring node based on a deterministic decision.

3. The deterministic network interface of claim 1, wherein the Media Access Control layer configured to detect errors in the data received, raise an error flag for the host system, or store the erroneous data in a memory means for further treatment in the host system.

4. The deterministic network interface of claim 3, further comprising an IP layer between the Media Access Control layer and the host system, configured to detect errors in the data received from said Media Access Control Layer, raise an error flag for the host system, or store the erroneous data in a memory means for further treatment in the host system.

5. The deterministic network interface of claim 1, further comprising a UDP layer with a DMA interface configured to transfer autonomously data between a memory of the host system and a pair of FIFO buffers.

6. The deterministic network interface of claim 5, configured to not transmit a message if it is determined that it has been relayed between neighbouring nodes more than a determined number of hops.

7. A deterministic network, in an aircraft, comprising a plurality of nodes arranged in a ring topology, each node comprising a network interface configured for connection with one host system and two Ethernet physical media, such that the interface is connectable with two neighbouring network interfaces, the interface comprising a Media Access Control layer (MAC), configured to receive and transmit data from and to said two neighbouring network interfaces, and receiving and transmitting data from and to the host system, wherein the deterministic network interface comprises a programmable configuration area and configured to insert or recognize IP or MAC addresses in the Ethernet packets based on an address table of the IP or MAC addresses of other nodes of the network stored in the configuration area, and wherein the transit of data through the network interface is time-deterministic.

8. The deterministic network of claim 7, having a communication mode in which nodes communicate between them by UDP packets exclusively, the IP or MAC addresses of the nodes being statically determined, the configuration areas of the network interfaces storing a table of the IP or MAC addresses of other nodes in the network.

9. The deterministic network of claim 7, wherein each interface configured to transfer messages received from one neighbouring node to the host system or relay messages received from one neighbouring node to the other neighbouring node based on a deterministic decision.

* * * * *